United States Patent [19]

Huber

[11] Patent Number: 5,372,713
[45] Date of Patent: Dec. 13, 1994

[54] LONG SAND TRAP FOR SEPARATING AND REMOVING SAND FROM WATER FROM INFLOW CHANNELS

[76] Inventor: Hans G. Huber, Zum Rachental 8, D-8434 Berching, Germany

[21] Appl. No.: 988,128
[22] PCT Filed: Jun. 24, 1992
[86] PCT No.: PCT/EP92/01422
§ 371 Date: Jan. 29, 1993
§ 102(e) Date: Jan. 29, 1993
[87] PCT Pub. No.: WO93/00489
PCT Pub. Date: Jan. 7, 1993

[30] Foreign Application Priority Data

Jun. 28, 1991 [DE] Germany ............... 4121393

[51] Int. Cl.⁵ .................. B01D 21/06; B01D 33/27
[52] U.S. Cl. .................. 210/158; 210/159; 210/162; 210/415; 210/523
[58] Field of Search ............. 210/154, 159, 158, 162, 210/523, 524, 415

[56] References Cited

U.S. PATENT DOCUMENTS

| | | | |
|---|---|---|---|
| 2,929,504 | 3/1960 | Lind et al. | 210/158 |
| 3,865,727 | 2/1975 | Broling et al. | 210/162 |
| 4,701,266 | 10/1987 | Janka et al. | 210/523 |
| 4,836,919 | 6/1989 | Huber | 210/159 |
| 4,838,995 | 6/1989 | Klausen | 210/523 |
| 4,859,322 | 8/1989 | Huber | 210/162 |
| 5,006,236 | 4/1991 | Croket | 210/162 |
| 5,110,461 | 5/1992 | Abel | 210/158 |

FOREIGN PATENT DOCUMENTS

| | | | |
|---|---|---|---|
| 618173 | 4/1961 | Canada | 210/523 |
| 0389789 | 3/1990 | European Pat. Off. | |
| 2832277 | 1/1980 | Germany . | |
| 3028541 | 10/1983 | Germany . | |
| 3941673 | 6/1991 | Germany . | |
| 4042167 | 7/1991 | Germany | 210/523 |
| 617767 | 2/1961 | Italy | 210/159 |
| 978891 | 12/1982 | U.S.S.R. | 210/523 |

*Primary Examiner*—Wilbur Bascomb, Jr.
*Attorney, Agent, or Firm*—Hopkins & Thomas

[57] ABSTRACT

A long sand trap for separating and removing sand from inflow channels, particularly of sewage treatment plants is provided with a settling channel (1) having in particular a trapezoidal cross-section and extending along a straight path. A transporting conveyor device (8) which is acting opposite to the direction of flow is provided in the bottom area (6). A classifying conveyor device (10) discharges the sand delivered from the transporting conveyor device (8) in an upwardly inclined manner. The classifying conveyor device (10) is arranged in the central longitudinal plane (3) of the settling channel (1). It has a discharge chute (17) which can be used selectively left-hand or right-hand.

10 Claims, 2 Drawing Sheets

LONG SAND TRAP FOR SEPARATING AND REMOVING SAND FROM WATER FROM INFLOW CHANNELS

FIELD OF THE INVENTION

The invention relates to a long or elongated sand trap for separating and removing sand from inflow channels, particularly of sewage treatment plants, comprising a settling channel having in particular a trapezoidal cross-section and extending along a straight path, said settling channel being provided with a collecting chamber for the sand in its bottom area, with a transporting conveyor device placed therein which is acting in a direction opposite to the flow direction effective within the inflow channel, and further comprising a classifying conveyor device which discharges the sand delivered from the transporting conveyor device in an upwardly inclined manner.

BACKGROUND OF THE INVENTION

By a long sand trap an elongated shallow sand trap is understood in which the flowing-through essentially takes place along a straight horizontal path. During the flowing-through along said path the sand contained in or carried by the water has the opportunity to drop towards the bottom of the settling channel and to enter a collecting chamber formed there. Thereafter the sand is removed from this collecting chamber, e.g. by means of a transporting conveyor device which in many cases is constructed as a conveyor worm.

By sand a material is understood which has a particle size of >0,2 mm in diameter. If possible the sand is to be separated without adhering organic constituents. Thus, the sand trap also serves the purpose of separating the sand from the sewage sludge. In so far it is important that the working direction of the transporting conveyor device is opposite to the direction of flow within the inflow channel. The long sand trap here in the area of the transport conveying device also serves the purpose for washing out the sand.

A long sand trap of the kind described above is known. It has a trapezoidal or roughly trapezoidal cross-section which is formed asymmetrically and has only one inclined wall. The transporting conveyor device is disposed within the collecting chamber at the lowest place of the settling channel, and thus, here, eccentrically with respect to the central longitudinal plane in the region of the continuous vertical wall of the channel. A classifying conveyor device which discharges the sand delivered by the transporting conveyor device in an upwardly inclined manner, belongs to this long sand trap. The classifying conveyor device must begin at a lower place than the transporting conveyor device in order to be in a position to receive and to discharge the sand delivered. It is known to arrange the classifying conveyor device, so to speak, adjacent the vertical wall and therewith outside the actual cross-section of the settling channel. This increases the cost of construction considerably. It is also known to dispose the transporting conveyor device eccentrically with respect to the central longitudinal plane of the cross-section of the settling channel, however, not at the lowest place, and to provide the classifying conveyor device at the lowest place, i.e. directly adjacent the vertical wall. In this case both the transporting conveyor device and the classifying conveyor device are disposed eccentrically with respect to the central longitudinal plane.

Finally, it is known to construct the cross-section of the settling channel symmetrically with respect to the central longitudinal plane and thus to form two inclined walls such that the lowest place and therewith the collecting chamber for the sand can be arranged in the central longitudinal plane of the settling channel. As a result of this arrangement the central longitudinal plane no longer is available for disposing the classifying conveyor device. Thus, the classifying conveyor device is provided eccentrically with respect to the central longitudinally plane.

These known long sand traps indeed are operated in advantageous manner such that the transporting conveyor device acts opposite to the direction of flow within the inflow channel, and therewith advantageously washes organic constituents out of the sand. However, the arrangements indicated above result in increased costs for the construction of the wall of the settling channel and the accommodation of the components. In all individual cases, the classifying conveyor device is provided eccentrically with respect to the central longitudinal plane such that the sand can be discharged only to one side of the classifying conveyor device, and namely to that side toward which also the classifying conveyor device is displaced eccentrically with respect to the central longitudinal plane. However, as it is required in sewage-treatment plants, depending on the structural conditions, to discharge the sand sometimes to the left and sometimes to the right of the classifying conveyor device, the necessity results to construct the long sand traps at one time as a left-hand discharge version and at another time as a right hand discharge version, whereby one version is a mirror image of the other version. Thereby the costs of production are increased.

From DE-PS 28 32 277 an arrangement for sewage-treatment is known which has also a long sand trap, wherein the transporting conveyor device for the sand in the collecting chamber as well as the classifying conveyor device for discharging the sand in an upwardly inclined manner are arranged in the central longitudinal plane of the channel cross-section. However, hereby the transporting conveyor device operates in the direction of flow, and the classifying conveyor device is seated downstream from the settling channel so that a considerable overall length is the result. Moreover, due to the operating direction of the transporting conveyor device, no sand is washed out, but the sand and the organic constituents are discharged together.

From DE-PS 30 28 541 a device is known for removing raked-off material, on the one hand, and sand, on the other hand, from inflow channels, particularly in sewage-treatment plants. A sand bucket wheel which has a comparatively large diameter is fixed to the shaft of the rake. The sand bucket wheel takes over the sand from the transporting conveyor device and delivers the sand to a classifying conveyor device the axis of which is arranged in parallel to the axis of the rake. A common drive is provided for the rake, the sand bucket wheel, the transporting conveyor device and the classifying conveyor device. The additional sand bucket wheel with its large diameter increases the costs for the total installation considerably. Also the overall length of the device is comparatively large. The transporting conveyor device in the collecting chamber for the sand operates in a disadvantageous manner in the direction of flow.

SUMMARY OF THE INVENTION

It is the object of the invention to further develop a long or elongated sand trap of the above mentioned type such that a uniform construction is obtained which allows sand to be discharged selectively to the left or to the right of the classifying conveyor device, thereby to avoid the construction of mirror inverted versions.

According to the invention this is achieved with a long sand trap of the aforementioned type in that the classifying conveyor device is arranged in the central longitudinal plane of the settling channel and has a discharge chute which can be selectively used left-hand and right-hand. This design can be realized either with an asymmetrical or with a symmetrical construction of the settling channel. The classifying conveyor device represents the lowest point and takes over the sand from the transporting conveyor device which in turn is arranged eccentrically with respect to the central longitudinal plane of the settling channel. The arrangement of the classifying conveyor device according to the invention impairs tile housing of the settling channel to a comparatively small extent. Only a corresponding matching opening is necessary at the place of penetration in the bottom area. Left-hand/right-hand versions no longer are necessary, and one version can be used in both cases. The discharge chute need only be joined with the upper end of the classifying conveyor device, pointing either in the right or left-hand direction. This can be achieved simply by changing a plug-in connection. The length of the classifying conveyor device is not increased by this construction, because paths of equal length result in the region of the discharge chute. Moreover, it is of advantage that the lowest point of the classifying conveyor device is arranged approximately at the beginning of the settling channel, because the transporting conveyor device operates opposite to the direction of flow in the channel. Thus the length of the settling channel simultaneously is used for accommodating the classifying conveyor device, which is disposed in an inclined manner within this length, whereby the overall length is not increased.

The classifying conveyor device has a conveyor worm which rotates within a tubular housing. While such a mode of construction for the classifying conveyor device is already known in the state of art, this construction enables a particularly simple possibility of accommodating the classifying conveyor device within the settling channel.

It is of particular advantage if the classifying conveyor device containing a conveyor worm is structurally united with a device for separating raked-off material collected from the water passed through a sieve or a grate. In this context, it is not only a matter of providing a common drive for the individual parts, but of achieving an integration in which parts of the one arrangement take over functions of the other arrangement as well. In doing this, the device for separating raked-off material may have a tubular housing and a conveyor worm, whereby the part of the tubular housing which projects into the settling channel is open on one side and provided with a sieve, grate or the like on the other side, while the remaining part of the housing essentially is provided with a closed wall. The conveyor worm of the classifying conveyor device and the conveyor worm of the device for separating raked-off material are connected structurally and with respect to their drive, whereby the conveyor worm of the device for separating raked-off material has no shaft in the area of the sieve, grate or the like and is constructed separately from the conveyor worm of the classifying conveyor device by a tubular wall. This simplifies the structural requirements considerably. Not only the sand bucket wheel known from the state of art is eliminated, but the classifying conveyor device is arranged with its axis in alignment with the device for separating raked-off material, whereby the conveyor worm of the device for separating raked-off material is in part also the conveyor worm of the classifying conveyor device. Only in the lower region are the two devices separated from each other, i.e. arranged inside and outside the tubular wall. One of the devices conveys the sand in an upwardly inclined mariner, while the other device separates the raked-off material and conveys it upwardly. Sand is combined with raked-off material, pressed through a compacting zone and discharged together. Here, also only one version is necessary for selective left-hand and right-hand discharge.

The conveyor worm of the device for separating raked-off material and the conveyor worm of the classifying conveyor device are connected with each other in a region above the sieve, grate or the like in that the tubular housing is formed as a closed body. Thereby, the structural length of the classifying conveyor device becomes considerably shorter.

The tubular wall between the two conveyor worms is mounted in a fixed location at the lower end in the bottom area of the settling channel. It extends upwardly between the two conveyor worms which are surrounding each other annularly, and it is open-ended at the place of junction. At this place not only the raked-off material is taken over but also the sand from the conveyor worm of the device for separating raked-off material.

The settling channel essentially may comprise only one inclined wall, and the collecting chamber for the sand and the transporting conveyor device located therein may be arranged eccentrically or offset with respect to the central longitudinal plane of the settling channel. This results in a particularly advantageous arrangement for the relation of the waste water amounts to be treated during raining and dry weather periods. However, an application of the invention is also possible, if the settling channel is of symmetrical construction with two inclined wall parts.

The classifying conveyor device is connected to the transporting conveyor device at the front end of the long sand trap so that the structural length of the settling channel is utilized for accommodating the classifying conveyor device.

The device for separating raked-off material can be a sieve worm. Depending on the requirements, the sieve can be constructed with different gap widths. This is of no influence on the classifying conveyor device.

The sieve worm may have a pressing zone for compacting the raked-off material and the sand. This pressing zone is arranged above the place where the raked-off material and the sand are combined and is formed essentially by a narrowing of the cross-section in the region of the conveyor worm.

BRIEF DESCRIPTION OF THE DRAWINGS

The invention will be further explained and described by means of two embodiment examples.

DETAILED DESCRIPTION

Figure 1:
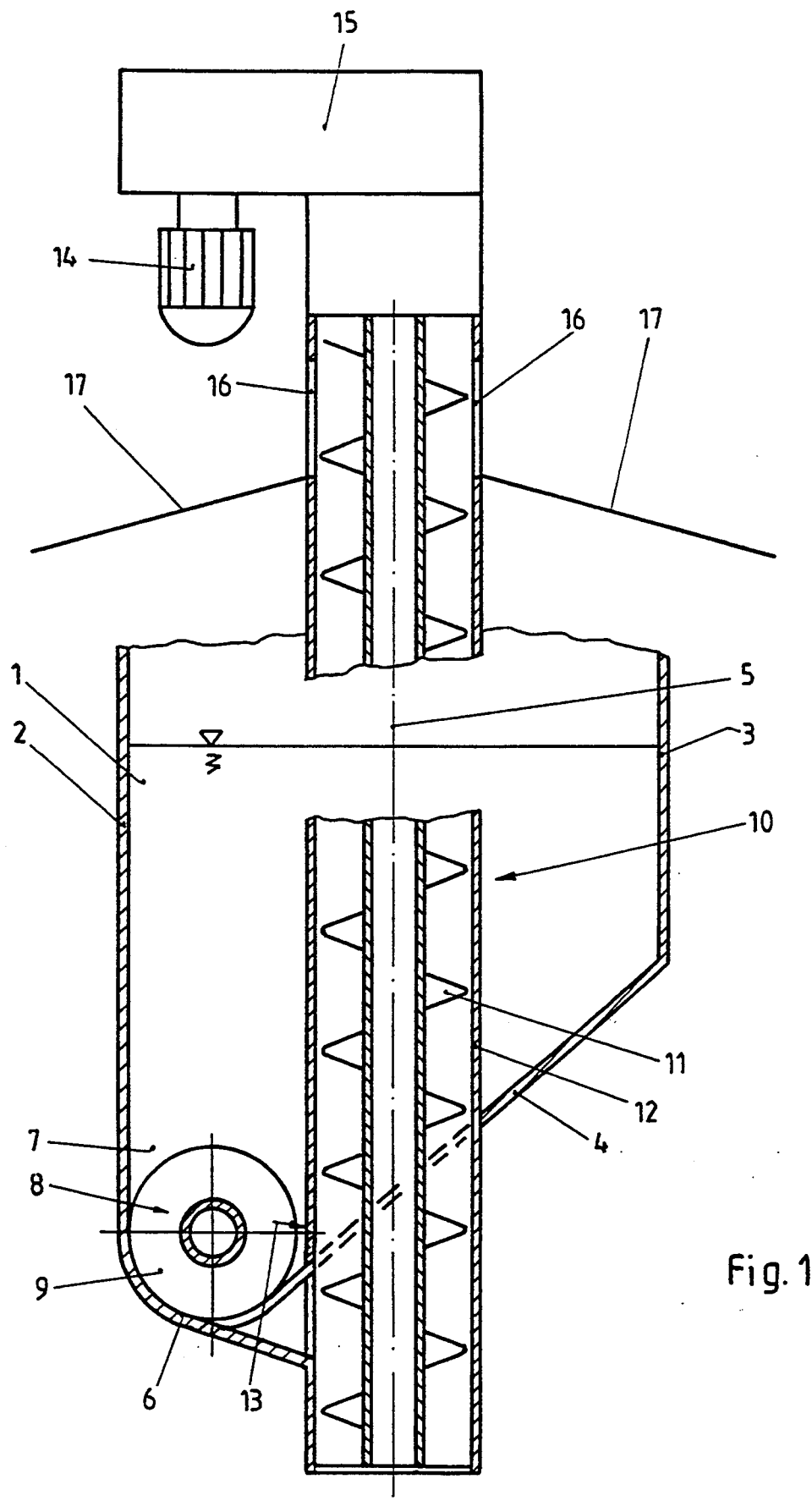
FIG. 1 shows a cross-section through the long sand trap and its settling channel with the basic arrangement of the parts which are essential for the invention.

In FIG. 1 a cross-section through a settling channel 1 is shown. The settling channel 1 has vertical walls 2 and 3 and an inclined wall 4. The settling channel 1 thus has a trapezoidal or a roughly trapezoidal cross-section which is formed asymmetrically with respect to its central longitudinal planes. In the area of the bottom 6, i.e. at the lowest place of the settling channel 1, a collecting chamber 7 for sand is formed in which a transporting conveyor device 8, here in the form of a conveyor worm, is provided. The transporting conveyor device 8 may also be constructed as a scraper belt or the like. A part of the walls 2, 4, so to speak, forms the housing of the conveyor worm 9 of the transporting conveyor device 8. The transporting conveyor device 8 is provided eccentrically, that is, it is offset, with respect to the central longitudinal plane 5.

A classifying conveyor device 10 is arranged in the central longitudinal plane 5. This device has a conveyor worm 11 which penetrates the inclined wall 4 together with a tubular housing 12 surrounding the conveyor worm 11 and insofar ends at a lower place as it would correspond to the arrangement of the transporting conveyor device 8. The classifying conveyor device 10 is arranged in the settling channel 1 upwardly inclined in the direction of flow and thus does not increase its construction length. The transporting conveyor device 8 operates opposite the direction of flow so that the lowest point of the classifying conveyor device 10 is situated at the beginning of the settling channel. Along the length of the settling channel the sand has the opportunity to settle and to travel to the region of the transporting conveyor device 8. It is conveyed by the conveyor worm 9 opposite the direction of flow 30 and, thereby, washed out, an opening 13 in the housing 12 of the classifying conveyor device 10. The sand enters the classifying conveyor device 10 and is conveyed upwardly by means of the driven conveyor worm 11. A motor 14 followed by a gearing 15 which is placed onto the upper end of the classifying conveyor device 10 serves as drive for the conveyor worm 11. The housing 12 is provided with two openings 16 in this upper end region, which can be selectively used and closed, and to which selectively a discharge chute 17 can be connected, in order to discharge the sand delivered from the classifying conveyor device 10 either to the left or to the right. Thus, the long sand trap is equally suited for discharge to the left and to the right. The settling channel 1 with its walls 2, 3, 4 can be formed from sheet metal, particularly from high-grade steel, and form a trough, which is to be arranged overground. However, it is also possible to construct the settling channel 1 as part of a concrete structure.

Figure 2:
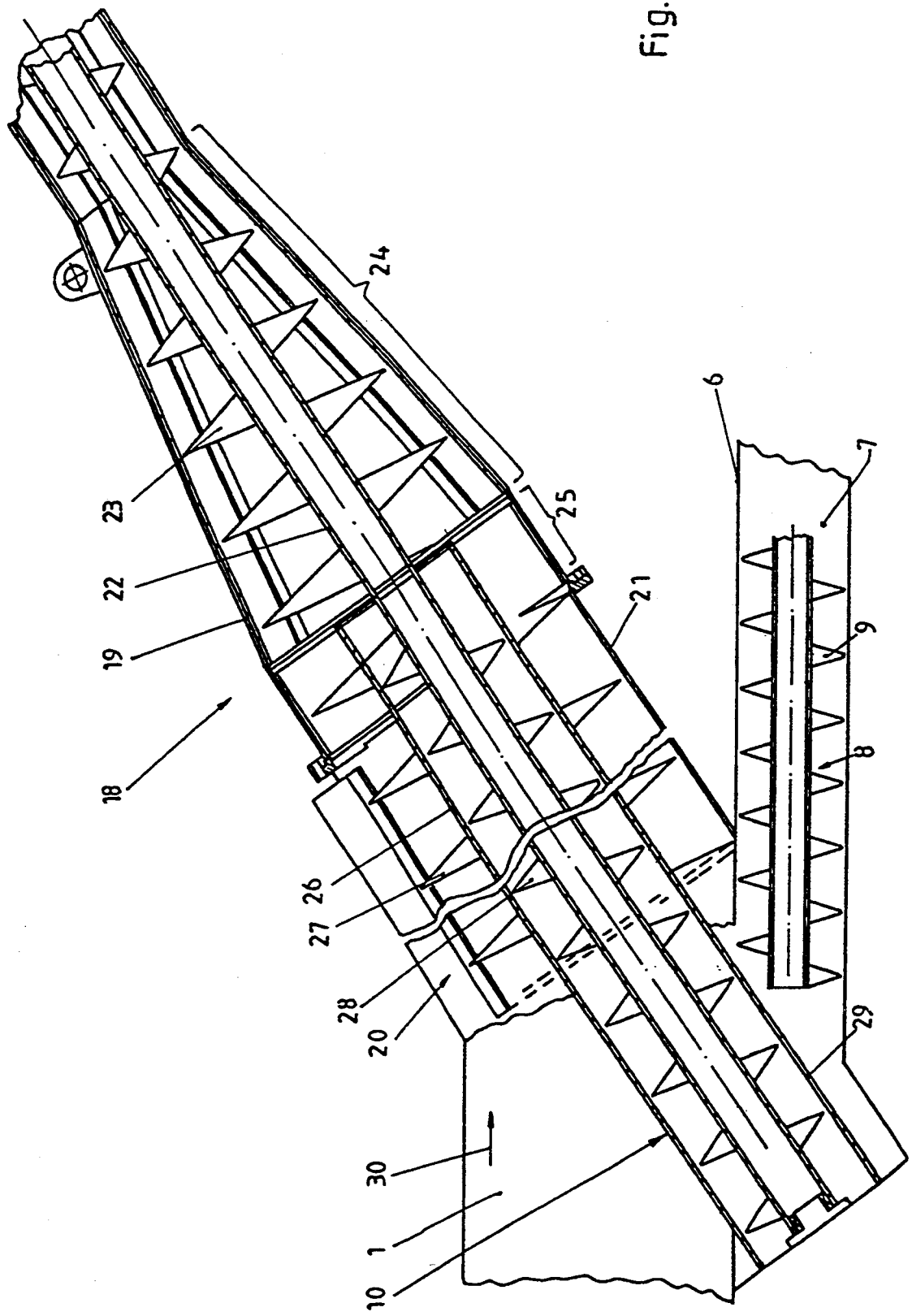
FIG. 2 shows a section along the central longitudinal plane of a second embodiment of the long sand trap with the integration of the devices for separating raked-off material and sand.

In FIG. 2 a second embodiment of the elongated sand trap is shown, which is structurally united here with a device for removing raked-off material. A settling channel 1 is provided, which may be constructed symmetrically or asymmetrically with respect to its central longitudinal plane 5 as shown in FIG. 1, which here is the plane of projection. The collecting chamber 7 with the transporting conveyor device 8 is provided in the area of the bottom 6. The trans porting conveyor device 8 may also be provided eccentrically or offset with respect to the central longitudinal plane 5.

A device 18 for separating raked-off material is provided which has an essentially tubular housing 19 which in its essential regions is formed as a closed body, particularly in those regions in which this device 18 rises above the water level. In the lower region, on the other hand, an inflow opening 20 is formed. A sieve, grate or the like 21 is provided on the other side for collecting the raked off material from the water passed through sieve 21. A driven shaft 22 is supported within the housing formed in such a way, which bears on its circumference a conveyor helix 23. The conveyor helix 23 fill s the space between shaft 22 and housing 19 in the upper and middle region of the housing 19. Here, also a pressing zone 24 is for med in which the cross-section is decreasing and thus a compacting of the conveyed material occurs. A closed cylindrical wall 25 is formed between the pressing zone 24 and the sieve, grate or the like 21. A tubular wall 26 which is anchored in a fixed location in the area of the bottom 6 of the settling channel 1 ends within this region of the wall 25. The convey or helix 23 continues in this region in an annular manner and without fastening towards shaft 22 and forms here a conveyor ring 27 for raked-off material around the wall 26. The shaft 22, however, continues on the inside of the wall 26 and, here, supports a conveyor helix 28 which, together with the shaft 22 and the wall 26, forms one part of the classifying conveyor device 10. In the lower region the tubular wall 26 is provided with an opening 29 facing the transporting conveyor device 8 for the transfer of the sand.

Device 18 can also include a sieve worm in place of sieve 21. It is anticipated that the sieve worm would be constructed of different gap widths dependent upon requirements for the material removed from the water flowing through settling channel 1. The sieve worm has a pressing zone 24 for compacting the raked-off material formed above the compacting zone by a narrowing of the conveyor worm cross section.

A driving unit comprising a motor and a gearing is again placed onto the upper end of the housing 19 which is not shown in FIG. 2. Here, also, openings are provided for the discharge chute 17 for selective use either left-hand or right-hand, as illustrated by means of FIG. 1.

The characteristic features of the embodiment of FIG. 2 is to be seen, for one thing, in that the classifying conveyor device 10 is structurally united with the device 18 for separating raked-off material and that the unit further has a common drive. The aligning axis is arranged in the central longitudinal plane 5. The transporting conveyor device 8 may likewise be arranged in the central longitudinal plane 5. In case it is arranged laterally offset, the end of the transporting conveyor device 8 extends further ahead opposite the direction of flow according to arrow 30.

In comparison to the embodiment according to FIG. 1 it is to be noted that the classifying conveyor device 10 has only a comparatively short length. The sand which is separated along the length of the settling channel 1 and is conveyed back to the beginning of the settling channel opposite the direction of flow according to arrow 30 reaches through the opening 29 the region of the conveyor helix 28 of the classifying conveyor device 10 and is conveyed in the tubular stationary wall 26 in an upwardly inclined manner, until it is discharged at the free end of the wall 26 into the region of the wall 25 of the device 18, where it is caught by the conveyor helix 23 which also conveys the raked-off material. The raked-off material itself separates from the water on the inner side of the sieve, grate or the like 21 and is conveyed by the conveyor ring 27 so that it also reaches the region 25. In this embodiment the axes of the device 18 for separating raked-off material and of the classifying conveyor device 10 coincide. The common axis is arranged in the central longitudinal plane 5 of settling channel 1 (FIG. 1) so that discharge paths of equal breadth are attained at the upper end (not shown) of the device 18 for separating raked-off material, mixed with the sand.

While a preferred embodiment of the invention has been disclosed in the foregoing specification and drawings, it will be understood by those skilled in the art that variations and modifications thereof can be made without departing from the spirit and scope of the invention, as set forth in the following claims.

Legend for Figures

1 = settling channel
2 = vertical wall
3 = vertical wall
4 = inclined wall
5 = central longitudinal plane
6 = bottom
7 = collecting chamber
8 = transporting conveyor device
9 = conveyor worm
10 = classifying conveyor device
11 = conveyor worm
12 = housing
13 = opening
14 = motor
15 = gear
16 = opening
17 = discharge chute
18 = device
19 = housing
20 = inflow opening
21 = sieve, grate or similar
22 = shaft
23 = conveyor helix
24 = pressing zone
25 = wall
26 = wall
27 = conveyor ring
28 = conveyor helix
29 = opening
30 = arrow

I claim:

1. An elongated sand trap for separating and removing sand and debris from water passed through the settling channel of a sewage or waste water treatment plant, where the settling channel has a generally trapezoidal cross section about, and extends along a longitudinal center plane, and where the settling channel has a collecting chamber formed at its bottom for collecting sand, a transporting conveyor disposed within the bottom of the collecting chamber for moving collected sand against the flow of water through the settling channel, and a classifying conveyor device disposed within said settling channel in a generally upward inclined manner from a fixed point in the settling channel in front of the transporting conveyor for both receiving sand from the transporting conveyor, and for transporting and discharging the collected sand from the collecting chamber, wherein the classifying conveyor device comprises:

a discharge chute (17) sized and shaped to discharge the collected sand to the right or left hand sides of the settling channel's (1) longitudinal center plane (5); and wherein the classifying conveyor device (10) is disposed within the settling channel (1) along the central longitudinal plane (5) of the settling channel.

2. The sand trap of claim 1, wherein the classifying conveyor device further comprises a tubular housing (12);
a conveyor worm (11) disposed within said tubular housing; and
drive means (14, 15) for rotating said conveyor worm within said housing.

3. The sand trap of claim 1, further comprising:

a device (18) for separating debris or raked off material from the water passed through the settling channel (1);

wherein the classifying conveyor device has a conveyor helix (28) for transporting the raked off material from the settling channel;

and wherein said device (18) and said conveyor helix (28) are formed as part of one integral assembly.

4. The sand trap of claim 1, further comprising a device (18) supported in settling channel (1) for separating debris or raked off material from the water passed through the settling channel, wherein said device (18) has a tubular housing (19), and a conveyor helix (23);

wherein said tubular housing (19) projects downward into the settling channel, and where that portion of tubular housing (19) projecting downward into settling channel (1) has a closed wall with an inflow opening (20) formed therein, and sieve means (21) formed in said housing opposite said inflow opening through which water from the settling channel passes;

wherein the classifying conveyor device (10) has a conveyor helix (28), and device (18) has a conveyor helix (23), and where both conveyor helices (28, 23) are disposed on and are structurally connected to one another along a common shaft (22), and drive means for rotating said shaft;

and wherein device (18) further comprises a tubular wall (26) disposed concentrically about, and spaced apart from, said conveyor helix (28) of the classifying conveyor device (10), and where conveyor helix (23) of device (18) is not disposed on shaft (22), nor connected to said conveyor helix (28), but is instead formed on the exterior periphery of said tubular wall (26) in that portion of tubular housing (19) in which sieve means (21) is formed.

5. The sand trap of claim 4, wherein said conveyor helix (23) and said conveyor helix (28) are connected to each other in a closed cylindrical wall section (25) of tubular housing (19) above that portion of said housing (19) in which sieve means (21) is formed.

6. The sand trap of claim 4, wherein said tubular wall (26) of tubular housing (19) has an upper and a lower end, and where the lower end of said tubular wall (26) is mounted in a fixed position on the bottom of settling channel (1).

7. The sand trap of claim 1, wherein the settling channel (1) has a single inclined wall (4) and wherein the collecting chamber (7) and the sand transporting conveyor device (8) are both offset with respect to central longitudinal plane (5) of settling channel (1).

8. The sand trap of claim 1, wherein the sand trap has a front and rear end, and where classifying conveyor device (10) is connected to transporting conveyor device (8) at the front end of said sand trap.

9. The sand trap of claim 3, where device (18) further comprises a sieve worm.

10. The sand trap of claim 9, wherein said sieve worm further comprises a pressing zone (24) disposed in tubular housing (19) for compressing debris and sand removed from the water passed through settling channel (1).

* * * * *